United States Patent [19]

Ogawa et al.

[11] Patent Number: 5,317,895
[45] Date of Patent: Jun. 7, 1994

[54] FLOWMETER PROVING APPARATUS

[75] Inventors: Yutaka Ogawa; Kimihiro Ichinose, both of Tokyo, Japan

[73] Assignee: Oval Engineering Co., Ltd., Tokyo, Japan

[21] Appl. No.: 33,998

[22] Filed: Mar. 19, 1993

Related U.S. Application Data

[63] Continuation of Ser. No. 797,744, Nov. 25, 1991, abandoned.

[30] Foreign Application Priority Data

Dec. 5, 1990 [JP] Japan ............................. 2-404638
Oct. 18, 1991 [JP] Japan ............................. 3-299785

[51] Int. Cl.$^5$ ............................................. G01F 25/00
[52] U.S. Cl. ............................................. 73/3
[58] Field of Search ................................. 73/3; 364/571.01–571.05

[56] References Cited

U.S. PATENT DOCUMENTS

| | | | |
|---|---|---|---|
| 4,253,156 | 2/1981 | Lisle et al. | 73/3 |
| 4,406,152 | 9/1983 | Palmer et al. | 73/1 H |
| 4,631,951 | 12/1986 | Bohm | 73/3 |
| 4,766,759 | 8/1988 | Cohrs et al. | 73/3 |
| 4,996,869 | 5/1991 | Cohrs et al. | 73/3 |
| 5,052,211 | 10/1991 | Cohrs et al. | 73/3 |

OTHER PUBLICATIONS

Manual of Petroleum Measurement Standards Chapter 4–Proving Systems Section 3–Small Volume Provers Measurement Coordination Department, First Edition, Jul. 1988 American Petroleum Institute.

*Primary Examiner*—Robert Raevis
*Attorney, Agent, or Firm*—Jordan and Hamburg

[57] ABSTRACT

A flowmeter proving apparatus for obtaining a reliable flow meter factor in a short time, using a flow-meter having a non-uniform pulse output with a small volume power. The flowmeter to be proved is connected in series with a small volume prover, using a by-pass valve. A CPU calculates irregularities of meter pulse spacing, determines the repeatability for a proving run from the number of counted meter pulses and a function given by the meter pulse number and the meter pulse space irregularity. The CPU then computes the proving pass number $N_p$ necessary for obtaining the required repeatability by substituting the repeatability value into another predetermined function.

6 Claims, 5 Drawing Sheets

FLOWMETER PROVING APPARATUS

This application is a continuation, of application Ser. No. 07/797,744, filed Nov. 25, 1991, now abandoned.

BACKGROUND OF THE INVENTION

The present invention relates to a flowmeter proving apparatus for proving flowmeters having non-uniform pulse outputs by using a reference volume cylinder and more particularly to a flowmeter proving apparatus having the function of calculating the number of proving runs necessary for obtaining the required repeatability of the proving test by using a small volume prover.

There are two conventional methods for proving flowmeters, one of which is called "an absolute proving method" whereby a flowmeter to be proved is connected in series with a precision cylinder having a calibrated reference volume and its reading during the displacement of the fluid of the reference volume through the calibrated section of the cylinder is directly compared to the above-mentioned fluid's volume or weight, and the other is called "a comparison method" whereby the flowmeter's reading is compared with a standard flowmeter. The "absolute proving method" is applied in the case where a high accuracy of instrumental error-correction is required. Generally, the absolute proving method is classified into two methods; one is "the tank method" using a standard tank having the known volume of its portion defined by its upper and lower levels, and the other is "the pipe method" using a reference volume pipe having the known volume in its calibrated section of the uniform cross-section.

The "standard tank method" cannot attain a high efficiency in performing proving tests since it requires much time and labor for reading the upper and lower levels, calculating the reference volume from the readings and so on. Conversely, in the case of "the pipe prover method", since whole meter pulses generated by a flowmeter to be proved are counted, and a rubber-made sphere of a diameter a little larger than the reference volume pipe's inside diameter is movable in the pipe under a low differential pressure of liquid therein, travels through the pipe section between its two positioned detectors (hereinafter called detectors). The result is compared with the reference volume and it is possible to obtain remote control and automated measurements thereby allowing the rationalization of the proving operation.

As regards the development of a flowmeter having a higher accuracy and a diversification of fluids for which flowmeters are used, it is necessary to achieve real time proving of the flowmeters through the pipe prover method using a small volume prover (hereinafter abbreviated to SVP) which is distinguished by its reduced size thereby allowing it to be transported by car or other vehicle by virtue of its short and small reference volume pipe.

The operating principle of SVP is such that a piston, sealably and slidably inserted in a cylinder of an even cross-section, travels through a calibrated section of the cylinder with its limits defined by the detectors to displace a constant volume of fluid through a flowmeter to be proved by comparing its readings with the measured volume of the fluid.

SVP systems are disclosed in chapter 4 "Proving System" of The Manual of Petroleum Measurement Standards issued in June of 1988 by The American Petroleum Institute.

As mentioned above, the flowmeter proving method by using the SVP is meant to compare the fluid's volume in the calibrated section of the reference volume pipe defined by the signals emitted from the detectors with the number of meter pulses emitted from the flowmeter for the same period. The time-interval between the first detector signal at proving pass start and the first meter pulse following said detector signal and the time-interval between the last detector signal at the proving pass end and the meter pulse proceeding or following said detector signal, i.e. volume less than meter pulse spacing, are determined as ratios to the number of high frequency clock pulses and a fractional part of the displaced volume are calculated as a sum of or the difference between the ratios (by the double-timing method).

However, the double-timing method requires the conducting of the proving at a constant flow-rate and the generation of meter pulses at a uniform pulse spacing, that is, if the flow-rate varies or the pulses are emitted in non-uniform pulse spacing, the result may involve a corresponding error.

The flowmeter's pulse space dispersion depend upon the types of flowmeters to be proved. For example, a turbine meter, in which a rotor, rotatable in proportion to the flow-rate to be measured, is placed close to the flowmeter sensor, may generate equally spaced pulses of an excellent SN-ratio while pulse dispersion may occur in the case of a flowmeter having a rotary transmitting mechanism such as a gear train between a rotor and a meter pulse generator as well as a positive displacement flowmeter wherein a rotor's rotation angle is not proportional to the flowmeter's displacement.

The above-mentioned manual of API proposes that in case of a flowmeter having a rotor placed adjacent to the meter pulse generator, the proving test shall be conducted five times (by five proving passes) in order to attain a meter repeatability of 0.05% and a meter factor (in liters per pulse) shall be calculated as an average of values obtained by these five tests.

In a proving test of a flowmeter, generating irregularly spaced pulses representing certain flow-rates, it is necessary to increase the number of a piston's travels (hereinafter called the number of proving passes) or to set larger allowances for repeatability.

For instance, in order to obtain a repeatability of not more than 0.1% it is necessary to conduct 10 proving passes. Furthermore, increasing the number of proving passes increases the flowmeter's repeatability and also improves the quality of the mean's value.

However, there is no description of the relationship between a number of proving passes, the required repeatability and the mete pulse variations.

SUMMARY OF THE INVENTION

It is an object of the present invention to provide a flowmeter prover which is capable of determining a number of proving passes necessary for getting the required repeatability in a proving test of a flowmeter generating irregularly spaced pulses.

It is another object of the present invention to provide a flowmeter prover which is capable of the obtaining of a reliable meter factor and reducing the proving test time by reducing unnecessary proving passes.

DESCRIPTION OF THE PREFERRED EMBODIMENT

In order to achieve the above-mentioned object the present invention provides a flowmeter prover (1) for use in a system for proving a flowmeter irregularly generating a series of pulses with a constant flow factor at a constant flow rate and connected in series with a reference volume cylinder of a constant cross-section including a piston capable of sealably sliding therein to displace a reference volume of fluid through a calibrated section of the cylinder for the purpose of determining a meter's factor by comparing the number of pulses from the flowmeter to be proved with the displaced reference volume. The prover further comprises a central processing unit (CPU) including, a means for measuring the irregularities of the spacing of meter pulses generated by the flowmeter to be proved, a means for calculating the number of meter pulses from the reference volume and the meter factor, a means for calculating the repeatability of a proving run according to the relationship between the repeatability of a proving run and the irregularity of the pulse spacing for a predetermined number of meter pulses, a means for calculating the required repeatability of the flowmeter to be proved according to the relationship between the required repeatability and the number of proving passes for a number of proving runs necessary for obtaining said repeatability; and a drive control unit for driving the reference volume cylinder piston according to the output of the central processing unit. The invention also provides a flowmeter prover (2) for use in a system for proving a flowmeter irregularly generating a series of pulses with a constant flow factor at a constant flow rate and connected in series with a reference volume cylinder of a constant cross-section including a piston being capable of sealably sliding therein to displace a standard volume of fluid through a calibrated section of the cylinder for the purpose of determining a meter factor by comparing the number of pulses from the flowmeter to be proved with the displaced reference volume. The proper further comprises a central processing unit including a means for predetermining a number of proving passes for a proving run and calculating a meter factor for the number of proving passes, a means for calculating a standard deviation of the calculated meter factors, a means for judging a finishing of a proving test when the standard deviation is not more than a given repeatability of the meter factor, determining a proving pass number for a proving run according to the standard deviation value of the meter factor when the standard deviation exceeding the given repeatability and conducting two proving runs when the proving pass number exceeding the given number; and a drive control unit for driving the reference volume cylinder according to the output of the central processing unit.

Figure 1:
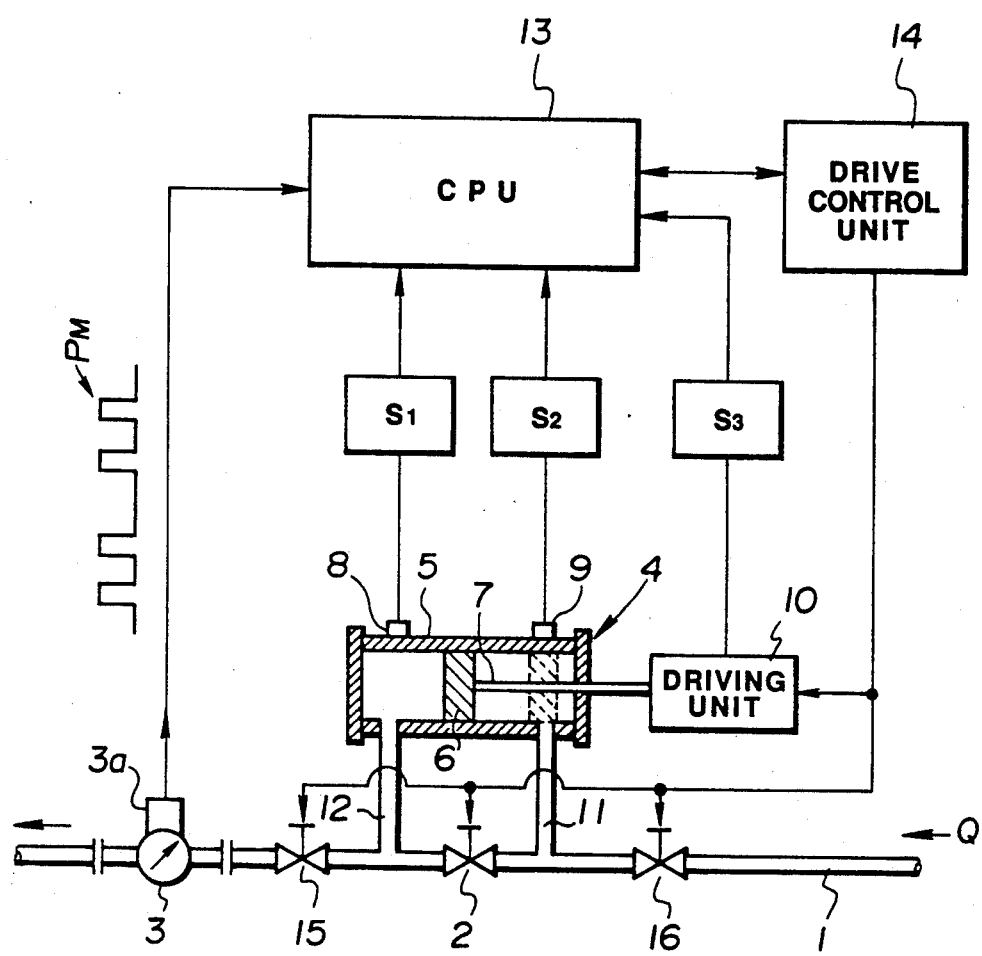
FIG. 1 is a block diagram showing an example of a principal configuration of a flowmeter proving apparatus embodied in the present invention.

A preferred embodiment of the present invention will be described as follows:

FIG. 1 is a block diagram showing the principal construction of a flowmeter proving apparatus according to the present invention, which is composed of a fluid-flowing pipe 1, a by-pass valve 2, a flowmeter 3 to be proved, a flow-rate pulse generator 3a, a small volume prover 4, a piston 6, a cylinder 5, a piston rod 7, detectors 8 and 9, a driving unit 10, conduits 11 and 12, a central processing unit (CPU) 13, a drive control unit 14 and valves 15 and 16.

In the case of the flowmeter proving apparatus shown in FIG. 1 the cylinder 5 serves as a reference volume pipe with both closed ends, which is precisely finished to be of a uniform inside diameter and provided with an internal sealing means (not shown) to allow the piston 6 to travel therein with no leakage. The piston 6 has at one end the piston rod 7 which is connected to the opposite end on its driving unit 10 for driving the piston 6 to move in its axial direction. The driving unit 10 also includes a position sensor (not shown) which detects the travel of the piston 6 and emits a position signal $S_3$ per unit of micro-distance when necessary. The detectors 8 and 9 are placed on the outside wall of both ends, respectively, of the cylinder 5. These detectors 8 and 9 emit position signals $S_1$ and $S_2$ respectively when the piston 6 passes through the positions detected by them. The reciprocating movement of the piston 6 in the cylinder 5 is realized by operating the valves 2, 15 and 16 according to command signals generated from the CPU 13.

The operations of the flowmeter proving apparatus are as follows:

A proving test starts when the CPU emits a starting signal on condition that the piston 6 is in the starting position indicated by a dotted line. The drive control unit 14 places the valves 15 and 16, in an open position and the valve 2 in a closed position while the driving unit 10 causes the piston to move at a constant speed. If the fluid's flow fluctuates, the moving speed of the piston 6 is controlled according to the position signal $S_3$ so as to maintain a constant flow-rate.

When the piston 6 passes the detector 9, a detecting signal $S_2$ is emitted and the meter pulse generator 3a of the flowmeter to be proved generates a series of pulses $P_M$ with non-uniform pulse spacings, which are counted until the piston 6 reaches the position of the detector 8. In the meantime the CPU 13 generates clock pulses of a high frequency (e.g. 100 kHz), by which means a volume less than a meter of pulse is detected by detecting both meter pulses succeeding respectively to detector signals $S_1$ and $S_2$ and so one proving pass is completed.

When a proving pass is finished, the valve 15 is closed, the by-pass valve 2 and the valve 16 are opened to return the piston 6 to the initial position indicated by a dotted line. Since the piston's positions when the meter pulses $P_M$ are emitted, succeeding respectively to detector signals $S_1$ and $S_2$ may be uncertain and unequal, the obtained proving result may include an unexpected error.

When the proving pass is repeated several times, there occurs a dispersion between the proving pass results which corresponds to the extent of the non-uniformity. For this reason, the number of proving passes is increased to improve the certainty of the test results. To improve the repeatability expressed in a percent, a proving run consisting of multiple proving passes is carried out and the repeatability of the test results is calculated a the repeatability of a proving run. The proving run is repeated, i.e. two proving runs are conducted.

Figure 3:
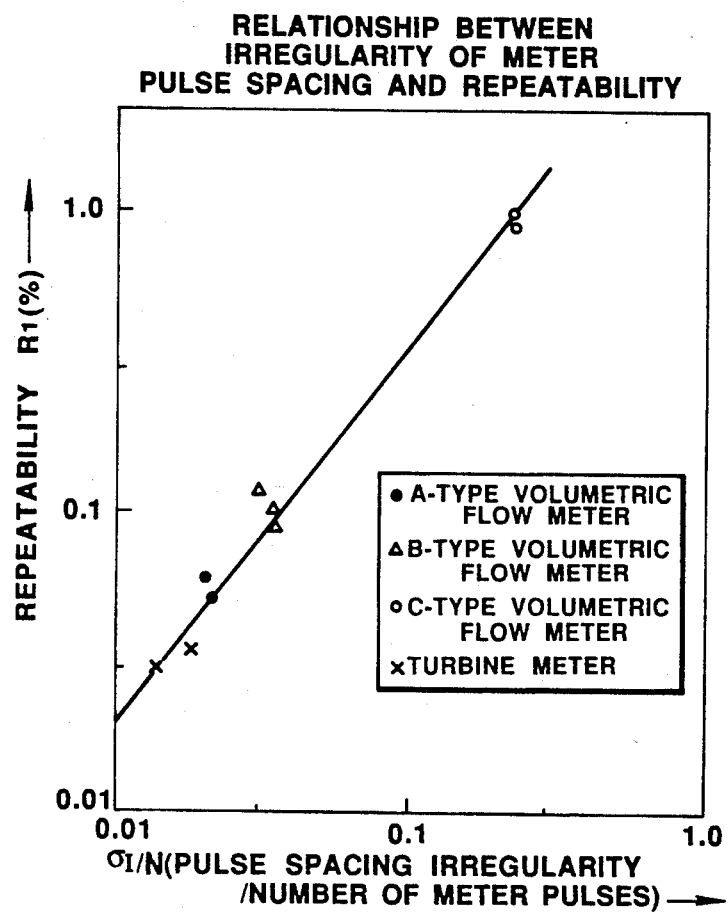
FIG. 3 is showing an example of the proving result concerning the relationship between the irregularity of meter pulse spacing and repeatability.

FIG. 3 shows an example of a proving result expressing the relationship between the meter pulse spacing irregularities and the repeatabilities of the positive displacement flowmeters A, B, C differing from each other by their design and a turbine meter. Each positive displacement flowmeter is provided with a transmission gear train. The graph, where the standard deviation $\sigma_I$ (%) of the irregularity of the meter pulse spacing in relation to the number of counted meter pulses N is represented by the horizontal axis and the repeatability $R_1$ (%) of a proving run for each pass is presented by a vertical axis, gives the following relationship:

$$N = (C/R_1)^a \cdot \sigma_I \ldots \quad (1)$$

As is apparent from the relationship, the repeatability $R_1$ for a proving run can be improved by reducing the irregularity $\sigma_I$ of the meter pulse spacing. A Constant C and the exponent a (e.g. a=1.0, C=4) are determined by functional relationships.

Figure 2:
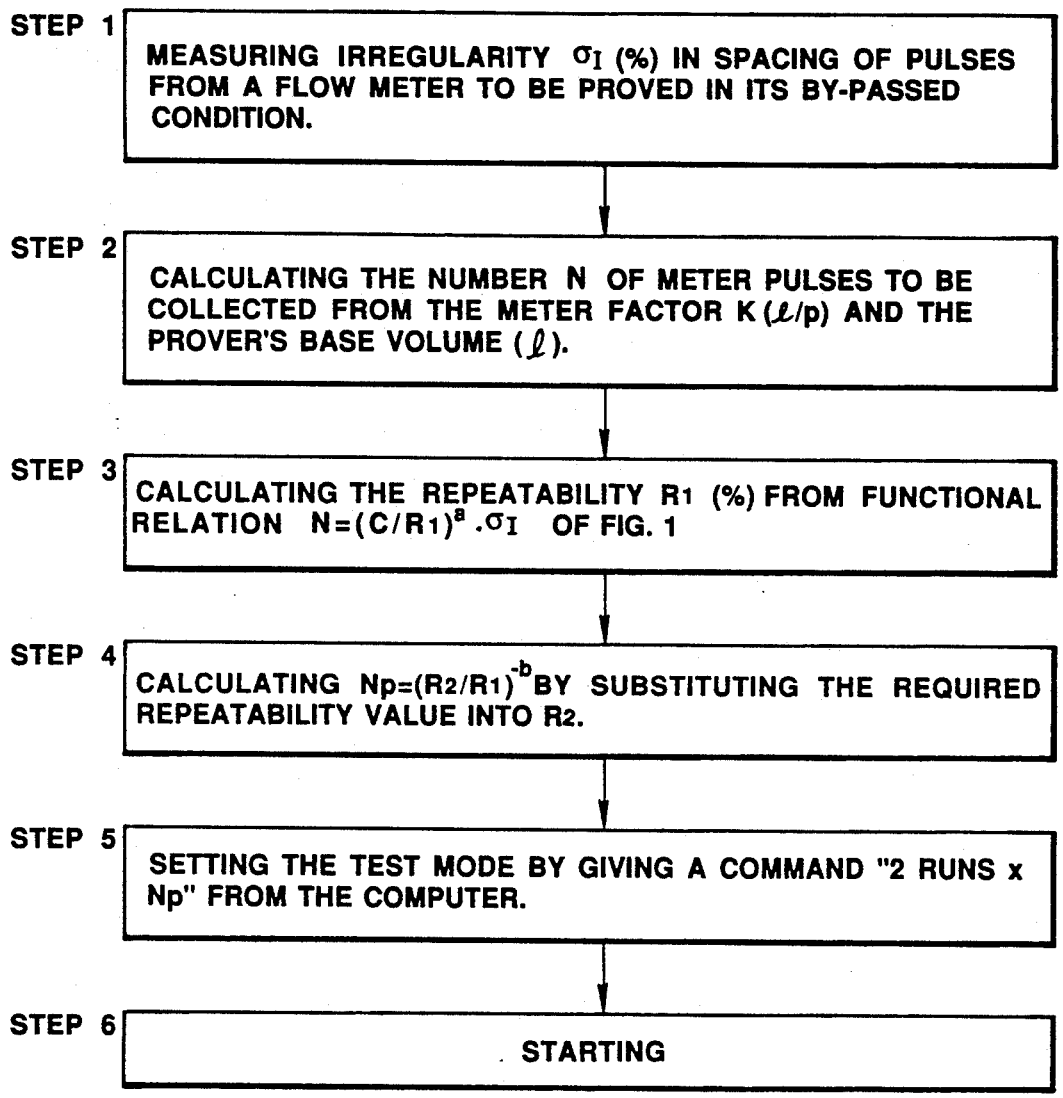
FIG. 2 shows a flow-chart for computer software.
Figure 4:
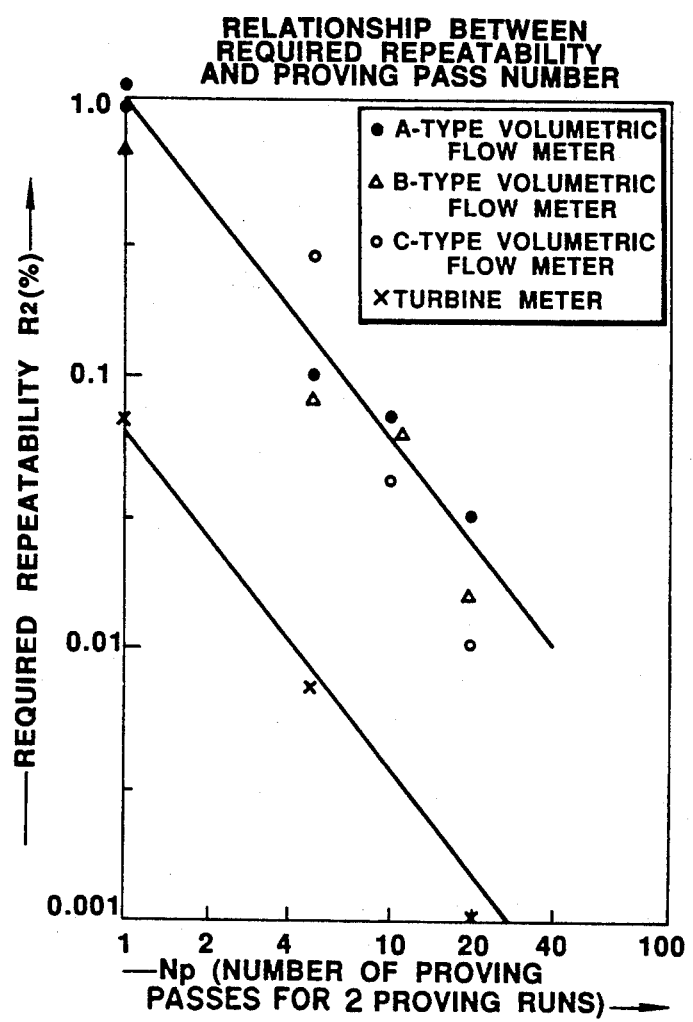
FIG. 4 is showing an example of a proving result showing the relationship between required repeatability (%) and a number of proving passes.

FIG. 4 is an example of proving results concerning the correlation between the required repeatability (%) and the number of proving passes for the same flowmeters as those proved in the tests of FIG. 2. The horizontal axis (abscissa) represents the proving pass number Np required for two proving runs and the vertical axis (ordinate) represents the required repeatability $R_2$ (%). From the graph the required number of proving passes for two proving runs is obtained as follows:

$$Np = (R_2/R_1)^{-b} \ldots \quad (2)$$

This relational expression shows that by increasing the required number of proving passes Np reduces the repeatability value and improves the reproducibility. An exponent b e.g. b=0.8) is determined by a functional relationship.

The present invention allows CPU 13 to determine the number of proving passes necessary for obtaining the required repeatability (%) based on the data indicated in FIG'S. 3 and 4: calculates the proving pass number Np required for two proving runs and then gives a command to the drive control unit 14 to repeat the test by the required number of passes.

FIG. 2 shows a flow chart of computer software composed of the following steps:

Step 1: The irregularity $\sigma_I$ (%) in the spacing of meter pulses generated by the flowmeter to be proved is measured with the by-pass valve 2 open and the piston 6 being still. In this case, meter pulses are sampled consecutively by N pulses and a standard deviation of the irregularity $\sigma_I$ from an average value X.

step 2: The number N of meter pulses to be collected is calculated from the meter pulses, meter factor K (l/p:liter/pulse) and the prover's reference volume (l:liter).

Step 3: The repeatability $R_1$ (%) for a proving run is calculated from the functional relationship (1) $N = (C/R_1)^1 \cdot \sigma_I$ according to FIG. 3 showing the relationship between the repeatability and the meter pulse spacing's irregularity.

Step 4: The number Np of the passes required for two proving runs, according to the functional relationship (2) $Np = (R_2/R_1)^{-b}$, is derived from the correlation between the repeatability and proving pass number Np shown in FIG. 4.

Step 5: The test mode is set in the CPU 13 by giving the command "Np×2".

Step 6: A command for conducting the flowmeter proving test according to the preset test mode is given to the drive control unit 14.

In the above-mentioned arithmetical operations, the first step determines the pulse spacing irregularity $\sigma_I$ (%) of the flowmeter to be proved as a standard deviation value $\sigma_I$ and the second step determines the number of pulses to be accumulated. The number N of meter pulses to be counted is determined as a value relating to the repeatability $R_1$ for one proving run. However, since the meter pulse number N in practice may be fixed depending on the flowmeter to be proven and the small volume prover, there is no need for specially calculating the above-mentioned pulse number N.

Figure 5:
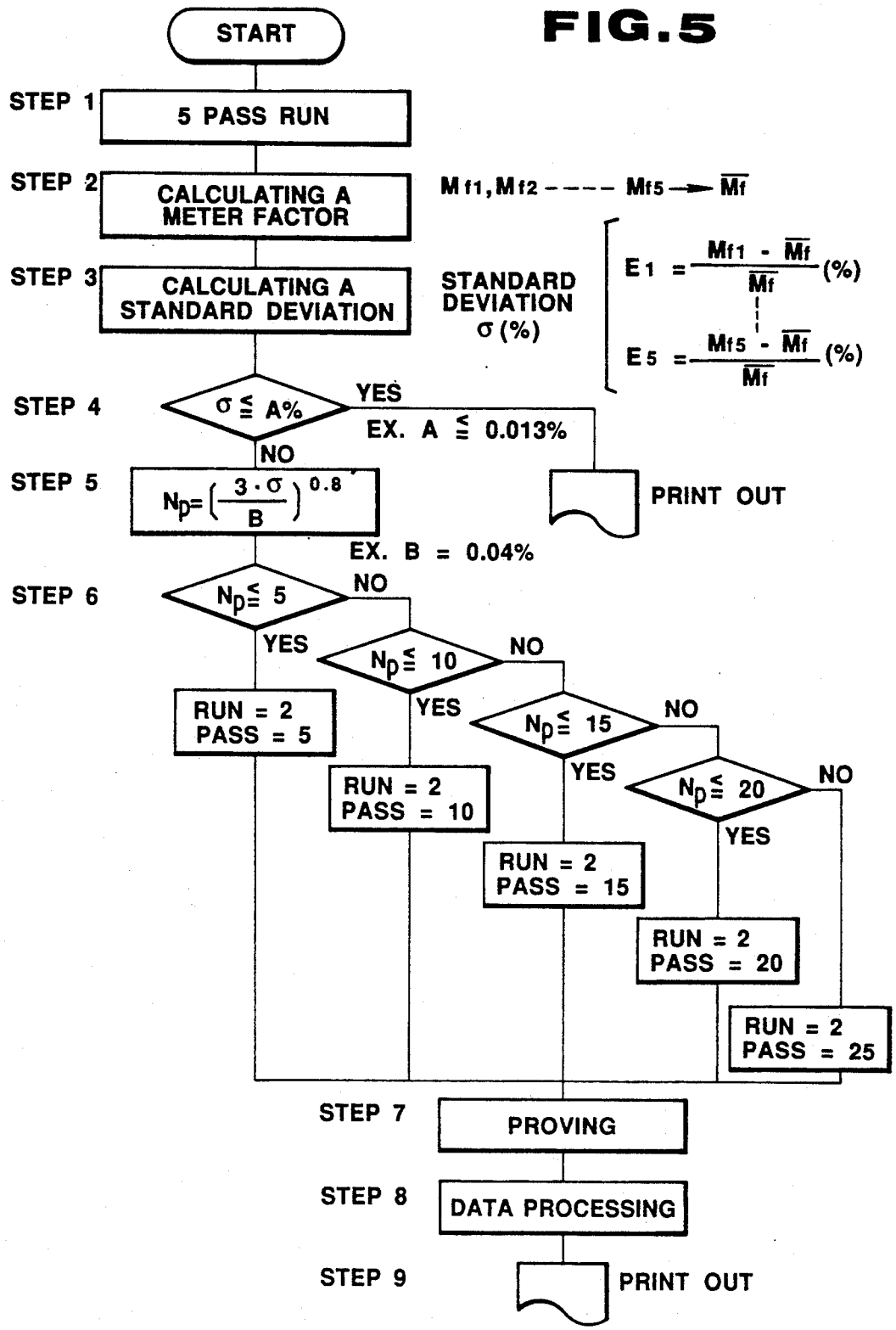
FIG. 5 shows the flow-chart of a central processing unit of another flowmeter proving apparatus according to the present invention.

FIG. 5 shows a flow chart of a CPU for another flowmeter proving apparatus embodying the present invention. For example, the number Np of proving passes during a proving run, i.e. the number of piston movements for one proving run is previously set. The meter factor for each proving pass number is calculated and a standard deviation c of the calculated meter factors is then determined. The number of proving passes for a proving run that is necessary to obtain the repeatability determined ,in accordance with the standard deviation value $\sigma$, can now be determined.

Step 1: The proving pass number Np for a proving run is determined to be five at a steady flow-rate.

Step 2: The average value $M_f$ of five meter factors $M_{f1}$, $M_{f2}$, $M_{f3}$, $M_{f4}$ and $M_{f5}$ measured at step 1 for every five proving passes is calculated.

Step 3: An error dispersion i (i=1, 2, ... 5) is calculated from the meter factors $M_{f1}$, $M_{f2}$, ... $M_{f5}$ for every proving pass and the average value $M_f$ of the meter factors and then a standard deviation $\sigma$ is computed from the positive square root of the error dispersion.

Step 4: When the calculated standard deviation $\sigma$ is less or equal to the limited accuracy, for example, of 0.013% of the small volume prover, the proving test is ended with the printing out of the standard deviation value as the repeatability of the flowmeter.

Step 5: If the calculated standard deviation $\sigma$ is more than the limited accuracy of 0.013% of the small volume prover, another repeatability, for example, B=0.04% to be obtained and the standard deviation value $\sigma$ are substituted into the following equation:

$$Np = (3\sigma/B)^\alpha \ (\alpha: \text{constant}) \ldots \quad (3)$$

in order to determine the number Np of proving passes when the flowmeter test is to be conducted by two proving runs. The present applicant has obtained the experimental value $\alpha=0.8$ according to the equation (3).

Step 6: By substituting the standard deviation value $\sigma$ obtained at step 3 and value B=0.04% into the equation (3) the numbers Np of the proving passes are calculated as multiples of the integer N=5, i.e. Np<5, Np<10, Np<15, Np<20 which increase as the standard deviation values $\sigma$ increase, and then the corresponding value N is adopted as a setting value.

Step 7: Based on the proving pass number N, e.g. of N>5, determined at step 6, the flowmeter proving test is conducted in two runs with 5 proving passes each.

Step 8: By processing the test result data obtained at step 7 a meter factor for each of the two proving run's is calculated and then a meter factor for two proving runs is finally determined as an average of the two meter factor values.

Step 9: The calculation results are printed out.

As is apparent from the foregoing description, according to the present invention, it is possible to provide the following effects:

Effect corresponding to claim 1: In the case of proving a flowmeter, having a non-uniform pulse output by the use of a small volume prover, the present invention provides the possibility to automatically set number of proofs necessary for obtaining the required repeatability (whereas the conventional method requires an increasing number of proving runs or passes to improve the repeatability), a reliable meter factor may be obtained and furthermore the unnecessary number of tests may be reduced thus saving time.

Effect corresponding to claim 2: Since the number of proving passes necessary for attaining the required repeatability can be determined according to the experimental value based on the standard deviation of the meter factor calculated by adopting the preset number of proving passes for a proving run at the given flow-rate, the flowmeter proving can be rationalized.

We claim:

1. A flowmeter proving apparatus for proving a flowmeter that irregularly generates pulsed outputs with a given meter factor at a constant flow-rate, comprising: a reference volume cylinder with a uniform cross-section for connection in series with the flowmeter to be provide, a piston sealably positioned to slide in said cylinder to displace a reference volume of fluid through a calibrated section thereof for the purpose of determining the meter factor by counting the number of pulses generated by the flowmeter in response to the passage therethrough of the reference volume; a central processing unit including means for determining a first number of proving passes for a first proving run, said central processing unit further comprising means for calculating meter factors from each of a number of proving passes equal to said first number, means for calculating a standard deviation of the calculated meter factors, means for judging that a proving test is finished when said calculated standard deviation is no greater than a first given repeatability of the meter factors, means for determining a second proving pass number for a second proving run as a function of said standard deviation value of the meter factor when the standard deviation exceeds said first given repeatability, and means for conducting two proving runs when the proving pass number exceeds said first given repeatability; and a drive control unit for driving the reference volume cylinder according to the output of the central processing unit.

2. The flowmeter of claim 1 further comprising means for measuring irregularities in the spacing of meter pulses generated by the flowmeter to be proved, means for calculating the number of meter pulses from the reference volume and the meter factor, means for calculating the repeatability of a proving run as a function of the relationship between the repeatability of a proving run and the irregularity of the pulse spacing for a predetermined number of meter pulses, and means for calculating a required repeatability of the flowmeter to be proved as a function of the relationship between the required repeatability and the number of proving passes for a number of proving runs necessary for obtaining said repeatability.

3. A flowmeter proving apparatus for conducting a proving test of a flowmeter that generates an irregularly times pulse output, with a given meter factor, at a constant flow-rate comprising:
a reference volume cylinder having a uniform cross-section and adapted to be connected in series with said flowmeter, a piston sealingly positioned in said cylinder to slide in a calibrated section thereof to displace a reference volume of fluid, a central processing unit connected to receive said pulse output and comprising means for determining a meter factor of said meter by counting the number of pulses generated by the flowmeter in response to the passage therethrough of the reference volume; said central processing unit further including means for determining a first number of proving passes for a first proving run, means for controlling a number of proving passes of said flowmeter equal to said first number, means for calculating meter factors from each of said proving passes, means for calculating a standard deviation of the calculated meter factors, means for stopping a proving test of said flowmeter when said calculated standard deviation is no greater than a first given repeatability of the meter factors, said central processing unit further comprising means for determining a second number of proving passes for a second proving run as a function of said standard deviation value of the meter factor when the standard deviation exceeds said first given repeatability, and means for conducting a second proving run with said second number of passes when the proving pass number exceeds said first repeatability; and a drive control unit for driving the reference volume cylinder according to the output of the central processing unit.

4. The flowmeter of claim 3 further comprising means for measuring irregularities in the spacing of meter pulses generated by the flowmeter to be proved, means for calculating the number of meter pulses from the reference volume and the meter factor, means for calculating the repeatability of a proving run as a function of the relationship between the repeatability of a proving run and the irregularity of the pulse spacing for a predetermined number of meter pulses, and means for calculating a required repeatability of the flowmeter to be proved as a function of the relationship between the required repeatability and the number of proving passes for a number of proving runs necessary for obtaining said repeatability.

5. The flowmeter of claim 4 wherein said means for calculating said required repeatability of the flowmeter to be proved comprises means for calculating a required repeatability $R_1$ according to the relationship:

$$N = (C/R_1)^a \sigma_I$$

wherein N is the number of counted pulses, $\sigma_I$ is the standard deviation, and C and $\alpha$ are constants.

6. The flowmeter of claim 3 wherein said means for determining a second number of passes comprises means for determining a second number $N_p$ of passes according to the relationship:

$$N_p = (3\sigma/B)^\alpha$$

wherein $\sigma$ is the standard deviation, B is the second repeatability and is greater than the first repeatability, and $\alpha$ is a constant.

* * * * *